June 5, 1928. 1,672,016

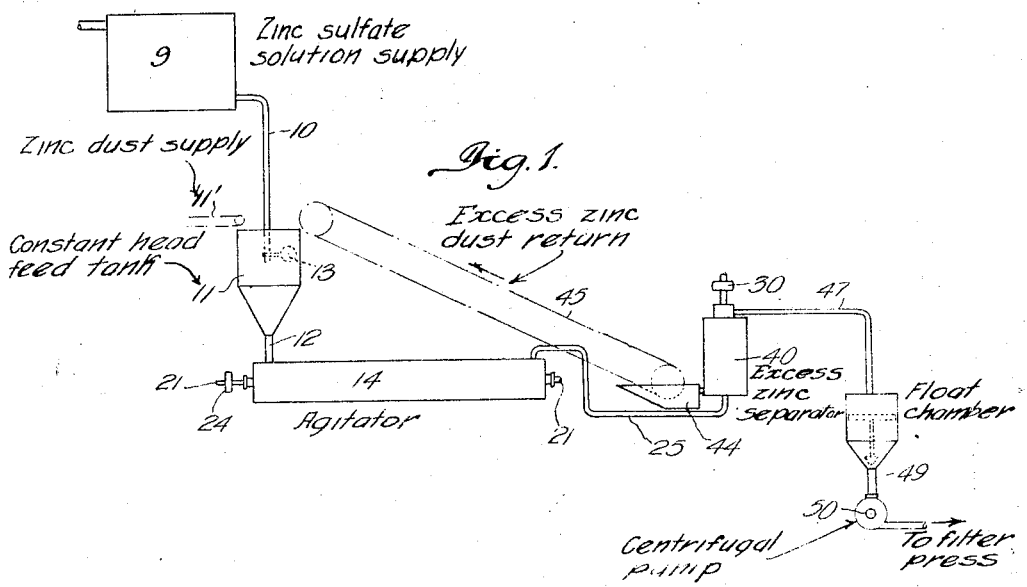
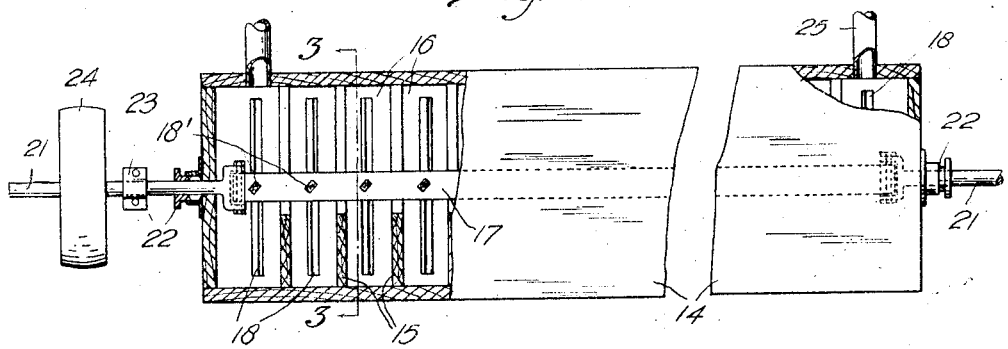
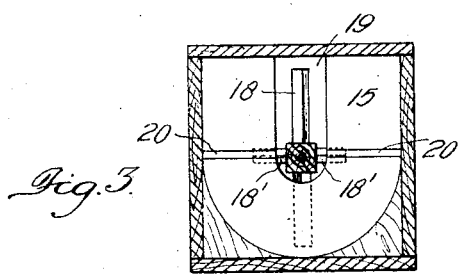
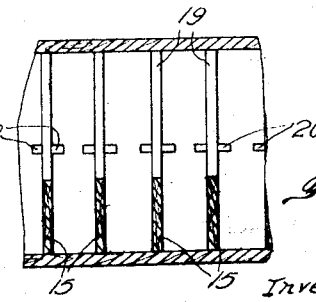

R. T. D. WILLIAMS ET AL

RECOVERY OF ZINC FROM ORES

Filed Sept. 11, 1926 2 Sheets-Sheet 2

Inventors
R T D Williams
and
S. W. Ross
By
Williams & ____
Attorneys

Patented June 5, 1928.

1,672,016

UNITED STATES PATENT OFFICE.

ROWLAND THOMAS DRYLL WILLIAMS, OF HOBART, TASMANIA, AND STAFFORD WALDO ROSS, OF CAMBRIDGE, NEAR HOBART, AUSTRALIA, ASSIGNORS TO ELECTROLYTIC ZINC COMPANY OF AUSTRALASIA LIMITED, OF MELBOURNE, AUSTRALIA.

RECOVERY OF ZINC FROM ORES.

Application filed September 11, 1926, Serial No. 134,835, and in Australia September 17, 1925.

This invention relates to certain improvements in the treatment of zinc bearing ores for the recovery of zinc by electrolytic deposition and refers more especially to that method of treatment wherein the ores are leached with spent electrolyte containing sulphuric acid obtained from the electrolysis of zinc sulphate solutions, the liquors being maintained in continuous circulation.

In the recovery of zinc by electrolytic deposition it has been found that the presence of salts of certain metals, such as cadmium and/or copper interferes with and detrimentally affects the deposition of the zinc in the electrolytic cells and for effective working it is essential that the said metallic salts (generally regarded as impurities) should be removed especially in view of the fact that some such impurities accumulate by the continuous circulation of the solution.

One method of purification of zinc sulphate solution preparatory to electrolysis comprises treatment with limestone for the precipitation of iron and other impurities and with finely divided zinc in the form of zinc dust or blue powder for the precipitation of any copper, cadmium, silver, arsenic, antimony or other metals which would interfere with the subsequent recovery of the zinc.

In the treatment of these zinc bearing solutions the aforesaid treatment with zinc dust or blue powder (usually known as "zinc dust purification") has usually been effected in large vessels or tanks having mechanical agitators. In practice it is the custom to feed a certain quantity of the impure solution into the tank or vessel together with the requisite quantity of zinc dust or blue powder which is considerably in excess of that theoretically required for removal of the impurities present. The batch of solution is maintained in a constant state of agitation for the requisite time for the precipitation of the metals and other impurities it is desired to eliminate.

In practice care must be taken to have sufficient zinc present to ensure that all of the metals or other impurities desired to be eliminated are precipitated whilst at the same time undue prolongation of the operation should be avoided to prevent the formation of an undue amount of basic zinc sulphate and thus consuming excessive zinc dust or the re-solution of the cadmium due to oxidation. Consequently in practice, in order to obtain an economical result, this operation of purification of the solutions by zinc dust treatment must be carefully controlled whilst furthermore such intermittent treatment in batches involves the expenditure of a considerable amount of time and labour with the consequent increase in operating costs.

Now the object of this present invention is to provide certain improvements in the treatment of zinc bearing ores wherein the zinc bearing solutions are subjected to purification by zinc dust for the elimination of certain metals and impurities preparatory to the recovery of zinc by electrolytic deposition whereby considerable savings in operating costs may be effected.

We accomplish the above object by subjecting the impure zinc sulphate solution to treatment with zinc dust in such manner that certain metals and other impurities which interfere with the electrolytic deposition of the zinc are eliminated during the flow of the solutions in contradistinction to the batch treatment at present in vogue.

This purification during the flow of the solution is effected under closed conditions whereby contact with air and oxidizing conditions is avoided.

In carrying this invention into practical effect the impure zinc sulphate solution together with zinc dust is passed more or less continuously through an enclosed purifying chamber wherein the same is vigorously agitated, and then to a separating apparatus for separating the solutions containing the precipitated impurities in suspension from unconsumed zinc dust still under closed conditions, returning the said separated unconsumed zinc dust to the inflow of the aforesaid purifying chamber and passing the separated solution containing the precipitated impurities in suspension to filter presses for removal and recovery of the copper and cadmium precipitate, the above solution passing to the electrolytic cells or other treatment for the recovery of zinc.

In one method of adapting the invention to the electrolytic recovery of zinc, the zinc bearing ores are first roasted or calcined in the ordinary way for the elimination of sulphur. These roasted ores or calcines are then subjected to treatment with spent electrolyte containing sulphuric acid and the impure solutions obtained therefrom are subjected to treatment with limerock (finely ground limestone) for the precipitation of iron and/or other impurities. After the separation of the solution from this precipitate (which is usually known as "limerock precipitate") a certain quantity of zinc dust or blue powder is added to the clear solutions whilst flowing more or less constantly through a pipe or launder and the mixture is delivered into a series of closed purifying vessels divided into a series of interconnecting compartments within which it is maintained in a constant state of agitation and through which the flow is so maintained that the requisite time is allowed for the practically complete reaction of the zinc dust upon the salts of the metals present and their precipitation enabling the solution to be delivered at the lower end of the series in a suitable condition for passing to separating apparatus for the separation of the heavier and larger particles of unconsumed zinc dust from the bulk of the solution containing the precipitated impurities. The solution containing the precipitated impurities is subsequently passed to filter presses or other apparatus for the elimination of the solid matter providing a solution in a suitable condition to be fed to the electrolytic cells for the electrolytic deposition of the zinc.

The separated unconsumed zinc dust or blue powder is returned along with a quantity of zinc dust or blue powder equivalent to that consumed in precipitating cadmium and copper to the pipe or launder feeding the closed purifying chamber.

In practice the apparatus preferably consists of a long enclosed box, placed horizontally, divided by vertical partitions into numerous compartments with suitable passages provided for the purpose of ensuring the flow of solution in series through the compartments. These passages are so placed as to minimize short-circuiting of the solution. A horizontal shaft running through the apparatus carries agitator blades in each compartment. Baffles are provided in each compartment to prevent the mere swirling of the solution and to ensure thorough mixing. Impure solution is fed into the first compartment of the series and at the same time there is added the amount of zinc dust or blue powder found necessary for the required degree of purification. The number of compartments is governed by the time required for the impure solution to pass directly through the apparatus and be subjected to complete purification. In practice it has been found that from thirty to forty compartments give satisfaction, but no hard and fast rule can be given for the number necessary.

The number and size of the compartments and the rate of flow of solution are so adjusted and controlled that the requisite period of agitation is such that practically complete precipitation of the impurities is effected between the inflow and the outflow without undue solution of excess zinc whilst re-solution of precipitated cadmium is avoided by the operation being carried out under non-oxidizing conditions.

The solution leaving the last compartment is then fed into what is termed a separating apparatus wherein the larger particles of unconsumed zinc dust or blue powder with small amounts of adhering precipitated impurities are separated still without contact with air from the majority of the precipitated impurities by means of gravity or of centrifugal action. The separated solids are returned to the inlet of the purifying chamber in order to allow the unconsumed zinc dust to do further work.

The overflow from the separating apparatus carries a small proportion of solids in suspension which solids consist in the main of the precipitated impurities. This solution is passed from the separating apparatus to filters or other means for the removal of the said precipitates without contact with air to obtain a clear solution suitable for feeding to the electrolytic cells for the deposition of zinc therein.

The above method of treatment is continuous in operation and is effected during the flow of the solutions and avoids the use of a considerable amount of time and labour incidental to the intermittent or batch method of treatment as heretofore in practice.

In the following description of the process reference will be had to the accompanying sheets of explanatory drawings wherein one form of apparatus adapted for putting the process into practical application is illustrated and in which:—

Figure 1 is a schematic view of the apparatus.

Figure 2 is a view in side elevation (partly in section) of the purifying chamber.

Figure 3 is a view in sectional end elevation taken on the dotted line 3—3 of Figure 2.

Figure 4 is a view in sectional elevation of part of the purifying chamber.

Figure 5:
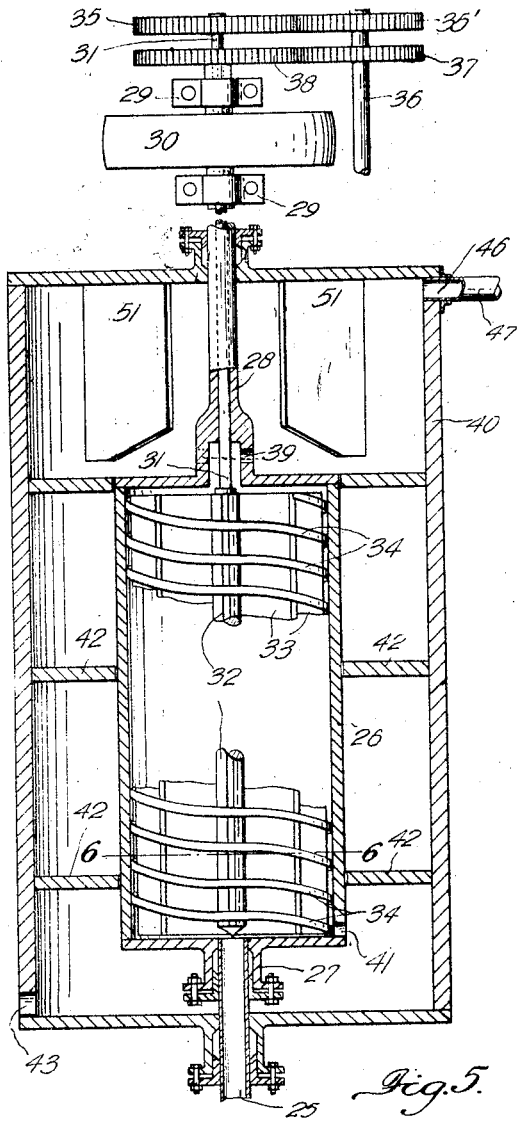
Figure 5 is a view in sectional elevation of the separating apparatus.
Figure 7:
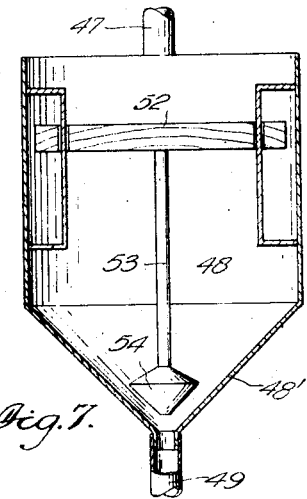
Figure 7 is a view in sectional elevation of a float chamber which is interposed between the separating apparatus and filter presses.
Figure 8:
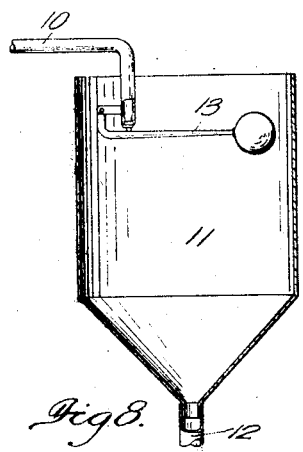
Figure 8 is a view in sectional elevation of a constant head feed tank for controlling the flow of impure solution to the purifying chamber.
Figure 6:
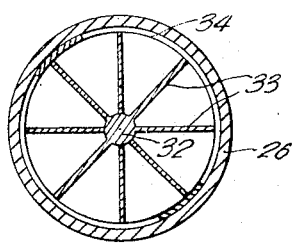
Figure 6 is a view in sectional plan of portion of the separating apparatus and is taken on the dotted line 6—6 of Figure 5.

In carrying out the process with the aid of the apparatus illustrated in the drawings the impure solution is fed from the supply tank 9 by a pipe 10 to the constant head feed tank 11 together with a requisite amount of zinc dust or blue powder. The zinc dust or blue powder is fed to the tank 11 in a slow but continuous rate by means of a belt conveyor 11' or in any other approved way.

The tank 11 is formed with a cone-shaped bottom terminating in a discharge pipe 12 and the solution is maintained at a constant level in the said tank by a ball float valve 13 arranged to control the rate of flow of the solution through the delivery pipe 10.

The solution is passed through the pipe 12 to the feed end of a purifying chamber 14 having a plurality of partitions 15 dividing it into a series of compartments 16.

A shaft 17 passes longitudinally through the purifying chamber and is fitted with series of long and short paddles 18 and 18' respectively so disposed that two long and two short paddles are adapted to agitate the solution in each compartment.

The long paddles 18 project from opposite sides of the shaft 17 and are arranged at right angles to the short paddles 18' and the said paddles are arranged alternately at 45° so as to eliminate end thrust on the shaft.

The object in providing the short paddles 18' is to enable the central part of the solution to be agitated more or less equivalently to the agitation of the solution in the outer part of the purifying chamber.

The partitions 15 are formed with openings 19, through which the shaft is placed in position and which permit of the solution circulating in the purifying chamber. The bottoms of the compartments are rounded to conform more or less to the sweep of the long blades and the compartments are made sufficiently numerous and of a size and shape as to prevent short circuiting of the solution.

Baffles 20 are arranged to project from opposite sides of each partition 14 and these baffles facilitate the agitation of the solution by preventing the action of the paddles merely swirling it around the compartments.

The shaft 17 provided with the paddles 18 and 18' may be made square in cross section and its ends can be connected to collinear shafts 21 which pass through glands 22 in the ends of the purifying chamber and are supported in bearings 23. The shaft and paddles are driven by belt and pulley gearing 24 or in any other approved way.

The solution passes from the last compartment through a pipe 25 to the lower end of a rotatively mounted separating chamber 26 of cylindrical form.

The pipe 25 passes into a gland 27 on the bottom of the separating chamber and the top of the separating chamber is provided with an axially disposed hollow shaft 28 which is mounted in suitable bearings 29. The hollow shaft 28 is provided with a belt pulley 30 whereby rotation may be imparted to the same and in practice the said separating chamber is rotated between 1000 and 1500 revolutions per minute.

A shaft 31 extends axially through the bore of the shaft 28 and its lower end is fitted to a core 32 carrying a plurality of radial vanes 33 which are embraced by one or more helical shaped worms or screws 34 fitting closely inside of, but sufficiently free to be easily revolved relatively to the separating chamber.

The lower end of the core 32 is situated in line with the discharge end of the pipe 25 and is tapered to deflect the solution radially as it enters the chamber.

The shaft 31 extends upwardly beyond the shaft 28 and is fitted with a gear wheel 35 which meshes with a gear wheel 35' fitted to a counter-shaft 36. A gear wheel 37 fitted to the counter-shaft meshes with a gear wheel 38 fitted to the upper end of the hollow shaft 28. These gearings are arranged in such a ratio that when the separating chamber is rotated the central shaft 31 supporting the vanes and helical worm will be rotated in the same direction and at a lower rate of speed.

Owing to the differential speed, the vanes and worm revolve slowly relatively to the separating chamber and the said worm moves any solid material at the periphery of the bowl in a downward direction.

The solution fed through the pipe 25 to the separating chamber is picked up by the vanes 33 and given a rapid circular movement which results in the majority of the larger particles being thrown to the periphery.

The solution is thus depleted of its larger particles but still retains the majority of the very fine particles of the precipitated impurities and then emerges at the top of the separating chamber through the passages 39 and into the top of the box 40 surrounding the said separating chamber. The separated solids conveyed downwards by the screw 34 emerge under centrifugal force through a passage 41 in the bottom of the separating chamber together with a certain amount of the liquor.

The whole separating chamber 26 is submerged beneath the surface of the liquor in the solution tight box 40 and a series of bands 42 extend from the sides of the said box into close proximity to the periphery of the chamber.

These bands 42 serve to keep the exits 39 and 41 separate and they fit sufficiently close to the periphery of the separating chamber to prevent the larger particles delivered to the lower part of the box passing upwardly therebeyond. The lower part of the box 40 is provided with an outlet 43 through which the larger particles and a certain amount of liquor in the form of pulp pass to a hopper 44 from which it is conveyed by an elevator 45 to the constant head feed tank.

The speed of the separator is so adjusted that a requisite degree of separation between large and small particles is obtained. A speed which is too high separates an excess of fine precipitated impurities whilst a speed which is too low allows a portion of the larger zinc dust particles to pass to the overflow from the separator.

Experiment will readily determine the most satisfactory rate at which the separator is to be revolved.

The overflow from the separator passes through an outlet 46 in the top of the box 40 and through a pipe 47 to a float chamber 48 having a conoidal shaped bottom 48′ which is connected by a pipe 49 to a centrifugal pump 50 for delivering the solution to filter presses, not shown.

The upper part of the box 40 extends above the separating chamber 26 and is provided with radially disposed baffles 51 which tend to prevent the solution swirling around the same due to the action of the said separating chamber thereby permitting the solution to flow more readily and in a less turbulent condition through the outlet pipe 47.

The float chamber is provided with a float 52 having a stem 53 depending from the centre thereof and terminating in a conical plug 54 which is adapted to seal the outlet when the solution reaches a low level therein.

When the tank is empty the weight of the float keeps the plug against the cone bottom and tends to seal the discharge outlet therefrom and as the solution enters it will lift the float and raise the plug to allow the solution to pass to the pump casing.

Thus, it will be understood that the float operated plug prevents the drawing in of air at this point.

It will be obvious that the overflow from the separator may pass to a launder for directing it to the float chamber. In this case, the launder should be of comparatively large size to obviate the solution turbulently entering the float chamber with the probability of it introducing air.

The centrifugal pump should be designed to obviate the drawing in of air and this precaution is necessary since the precipitate suspended in the solution the pump is handling is high in cadmium and low in metallic zinc and both of these factors are favorable to re-solution of cadmium under oxidizing conditions.

In the foregoing description, where it is stated that the solution should flow to and from the separator "without turbulence" it is intended to mean that the flow of the solution at these stages should be as tranquil as possible and this applies more especially in cases where antimony and/or arsenic is present in the solution.

The above process of treatment is continuous in operation and is effected during the flow of the solutions and obviates the use of a considerable amount of time and labour incidental to the intermediate or batch method of treatment ordinarily employed.

In addition, whilst practically complete elimination of those metals capable of being removed by zinc dust treatment is effected, a smaller quantity of excess of zinc dust is required, and furthermore it has been found that in practice coarser zinc dust may be economically used than heretofore.

By the above method of treatment the factors necessary for the elimination of the impurities are put into effect, namely, the rapid agitation with a maximum of contact between the zinc dust or blue powder and the solution under non-oxidizing conditions so that re-solution of the cadmium and consumption of an undue excess of zinc dust is avoided; the presence of a relatively large excess of zinc dust or blue powder during the purification process for the rapid precipitation of the impurities present and finally the rapid passage of the solution through the apparatus.

We have found that during rapid agitation under the conditions as set out above the fine particles of copper and cadmium as precipitated on the surface of the particles of the zinc dust or blue powder are dislodged providing a fresh surface of zinc for the precipitation of further quantities of copper and cadmium.

The heavier zinc dust particles separated at the bottom of the separator leave the copper and cadmium in suspension in the solution and the settled zinc dust is returned to the first compartment of the purifier for use on fresh quantities of impure solutions while the copper and cadmium precipitate remaining in suspension pass to the filter presses for their separation from the clear solution.

By this means the concentration of metallic zinc in the purifying vessels or tanks is built up to a fairly high figure so that by means of rapid agitation the actual purification of the solution flowing therethrough is effected in a minimum amount of time which is essential for the prevention of the re-solution of certain metals such as cadmium and the consumption of an undue amount of zinc dust.

In practice it has been found that with a consumption of 125–150% of the amount of zinc dust theoretically required for the reduction of the impurities present it is practicable to effect practically complete elimination of the copper, cadmium and other impurities during the flow of the solution through the apparatus in such a manner that their contact with the zinc dust ranges over the period of from 3 to 5 minutes. The time will vary according to the size of the agitating apparatus; the relative amount of zinc dust and impurities present and the amount of agitation given during purification.

We claim:

1. In the treatment of zinc-bearing ores for recovery of zinc, a process for purifying a zinc sulphate solution which consists in agitating such solution in the presence of zinc dust under non-oxidizing conditions to effect a precipitating reaction between such dust and the impurities of the solution.

2. In the treatment of zinc-bearing ores for recovery of zinc, a process for purifying a zinc sulphate solution which consists in continuously conveying and agitating such solution in the presence of zinc dust with exclusion of air to effect a precipitating reaction between such dust and the impurities of the solution.

3. In the treatment of zinc-bearing ores for recovery of zinc, a continuous process for purifying a flowing zinc sulphate solution which consists in continuously introducing zinc dust into the flowing solution, agitating the flowing solution in the presence of such dust and in the absence of air to effect a precipitating reaction between such dust and the impurities, and separating unconsumed dust from the flowing solution containing the precipitated impurities in suspension.

4. In the treatment of zinc-bearing ores for recovery of zinc, a continuous process for purifying a flowing zinc sulphate solution, which consists in continuously introducing zinc dust into the flowing solution, agitating the flowing solution in the presence of such dust and in the absence of air to effect a precipitating reaction between such dust and the impurities, separating unconsumed zinc dust from the flowing solution containing the precipitated impurities in suspension with exclusion of air, and returning the separated unconsumed zinc dust back into the solution from which the impurities are to be precipitated.

5. In the treatment of zinc-bearing ores for the recovery of zinc, a continuous process for purifying a flowing zinc sulphate solution which consists in continuously introducing zinc dust into the flowing solution, agitating the flowing solution in the presence of such dust and in the absence of air to effect a precipitating reaction between such dust and the impurities, separating unconsumed zinc dust from the flowing solution containing the precipitated impurities in suspension, and conveying said solution after separation of the unconsumed zinc dust with exclusion of air to filtration.

6. In the treatment of zinc-bearing ores for the recovery of zinc, a continuous process for purifying a flowing zinc sulphate solution which consists in continuously introducing zinc dust into the flowing solution, agitating the flowing solution in the presence of such dust and in the absence of air to effect a precipitating reaction between such dust and the impurities, and separating unconsumed zinc dust from the flowing solution containing the precipitated impurities in suspension with exclusion of air.

7. In the treatment of zinc-bearing ores for the recovery of zinc, a continuous process for purifying a flowing zinc sulphate solution which consists in continuously introducing zinc dust into the flowing solution, agitating the flowing solution in the presence of such dust and in the absence of air to effect a precipitating reaction between such dust and the impurities, separating unconsumed zinc dust from the flowing solution containing the precipitated impurities in suspension with exclusion of air, and conveying said solution after separation of the unconsumed zinc dust with exclusion of air to filtration.

In witness whereof we hereunto affix our signatures.

ROWLAND THOMAS DRYLL WILLIAMS.
STAFFORD WALDO ROSS.